R. A. BERGER.
MACHINE FOR WRAPPING SWEETS.
APPLICATION FILED SEPT. 30, 1913.
1,144,022.
Patented June 22, 1915.
8 SHEETS—SHEET 6.
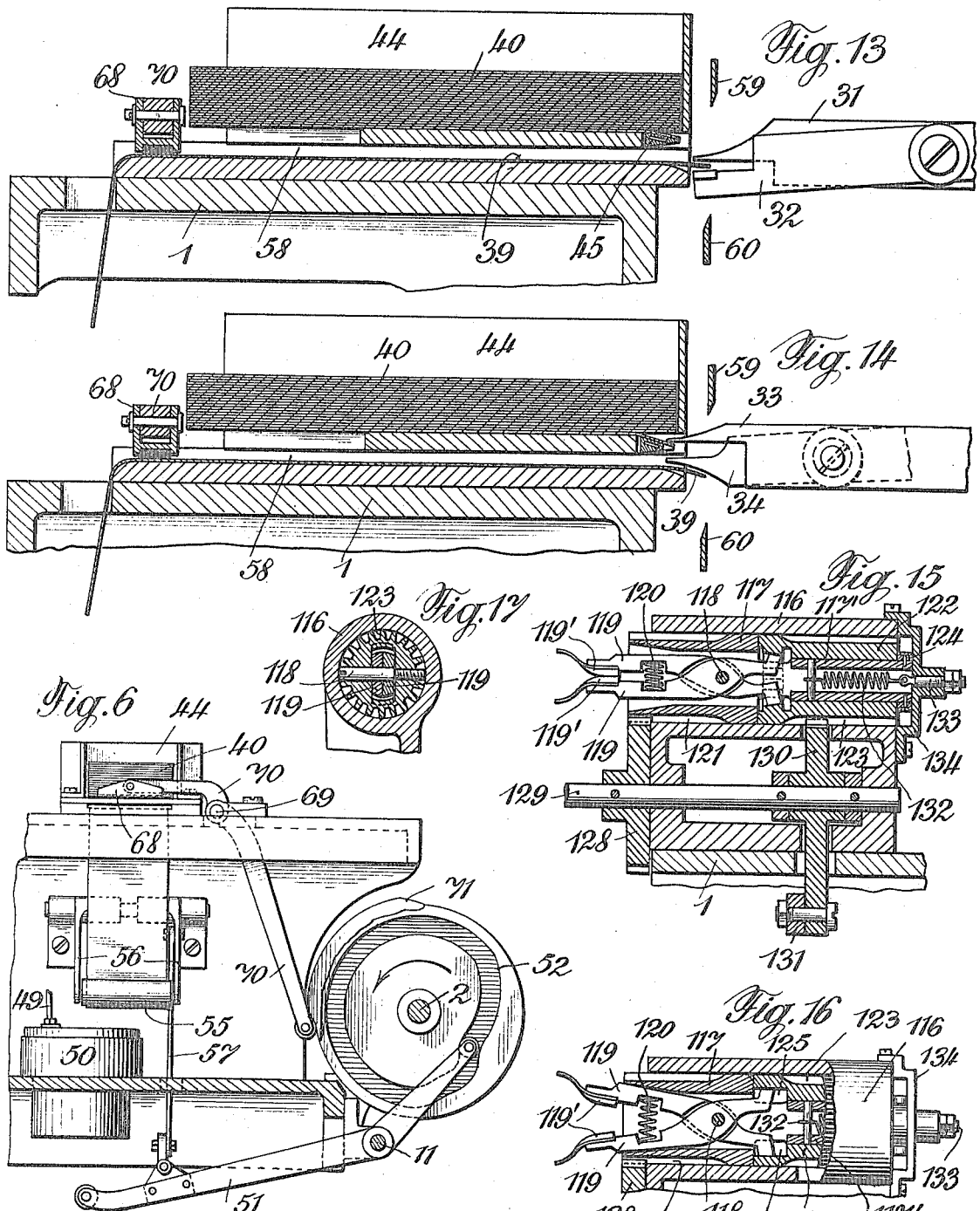

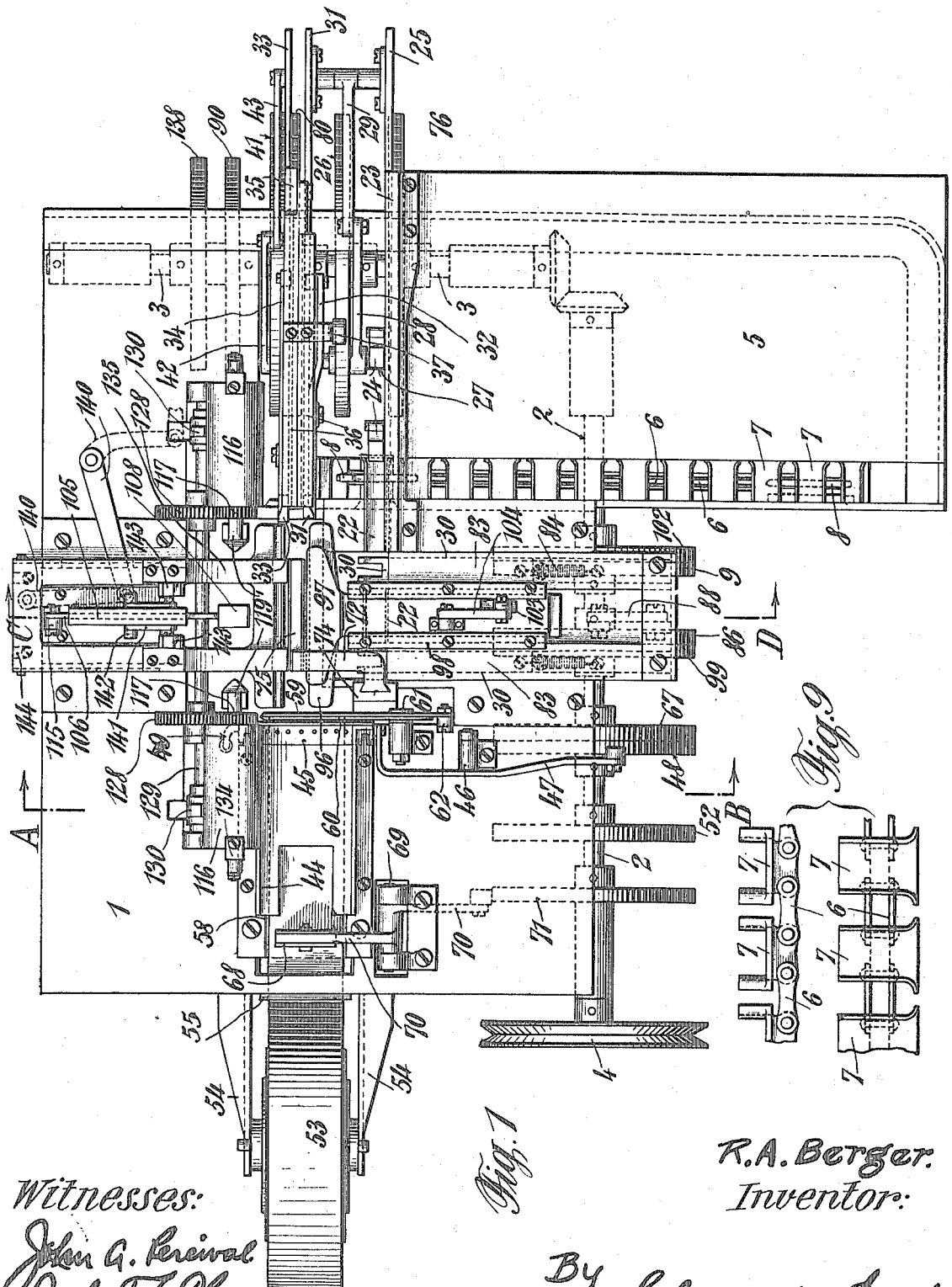

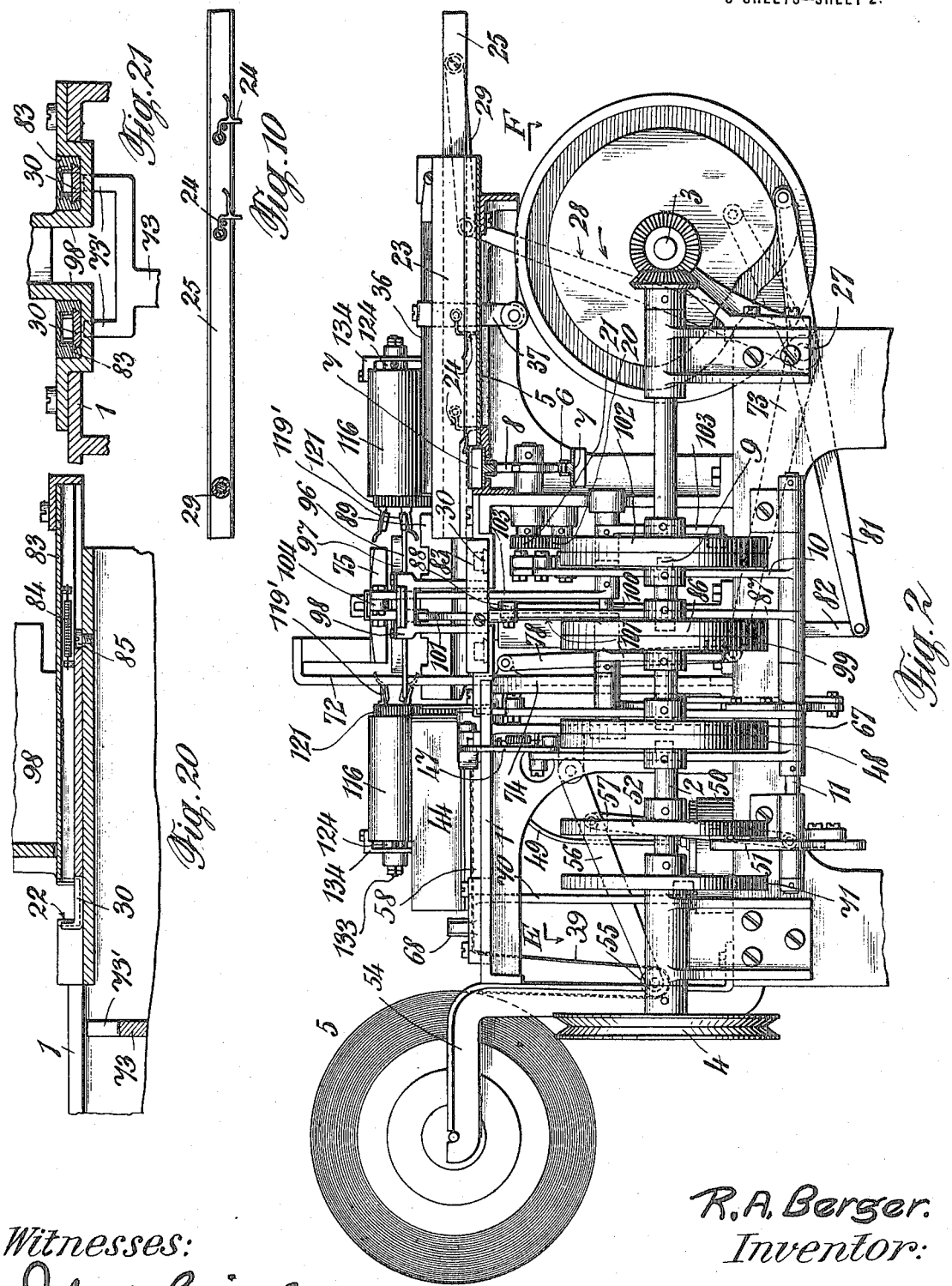

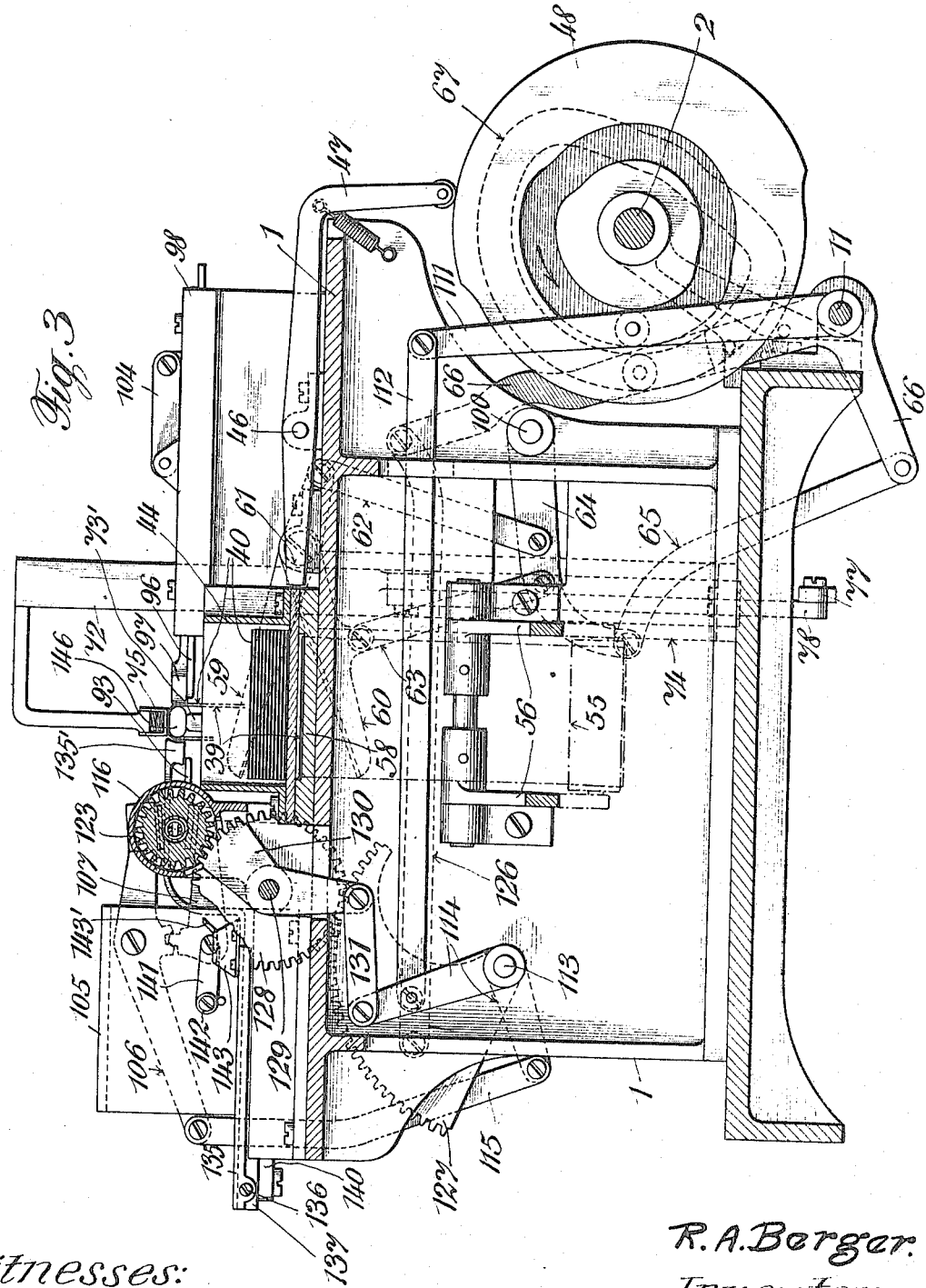

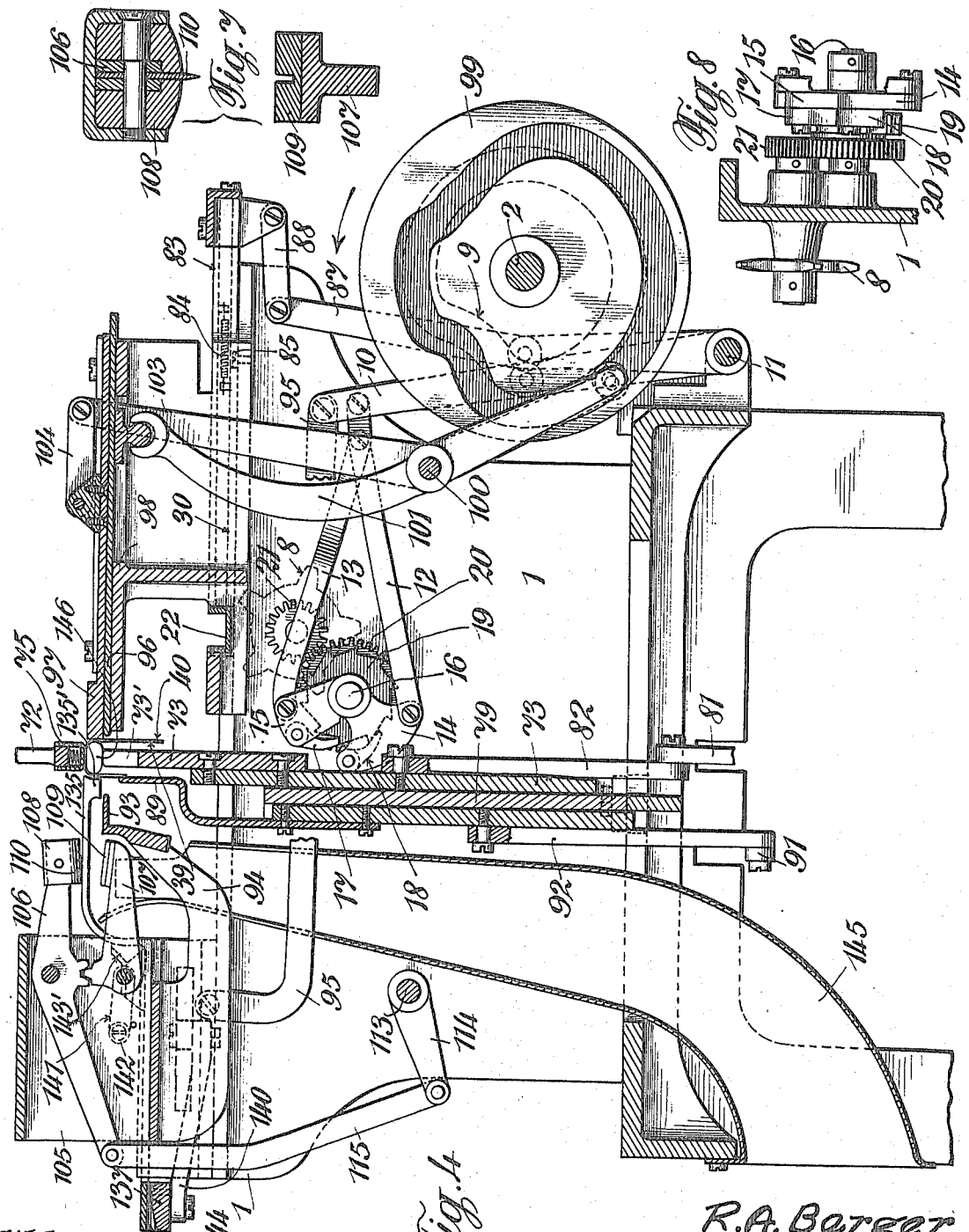

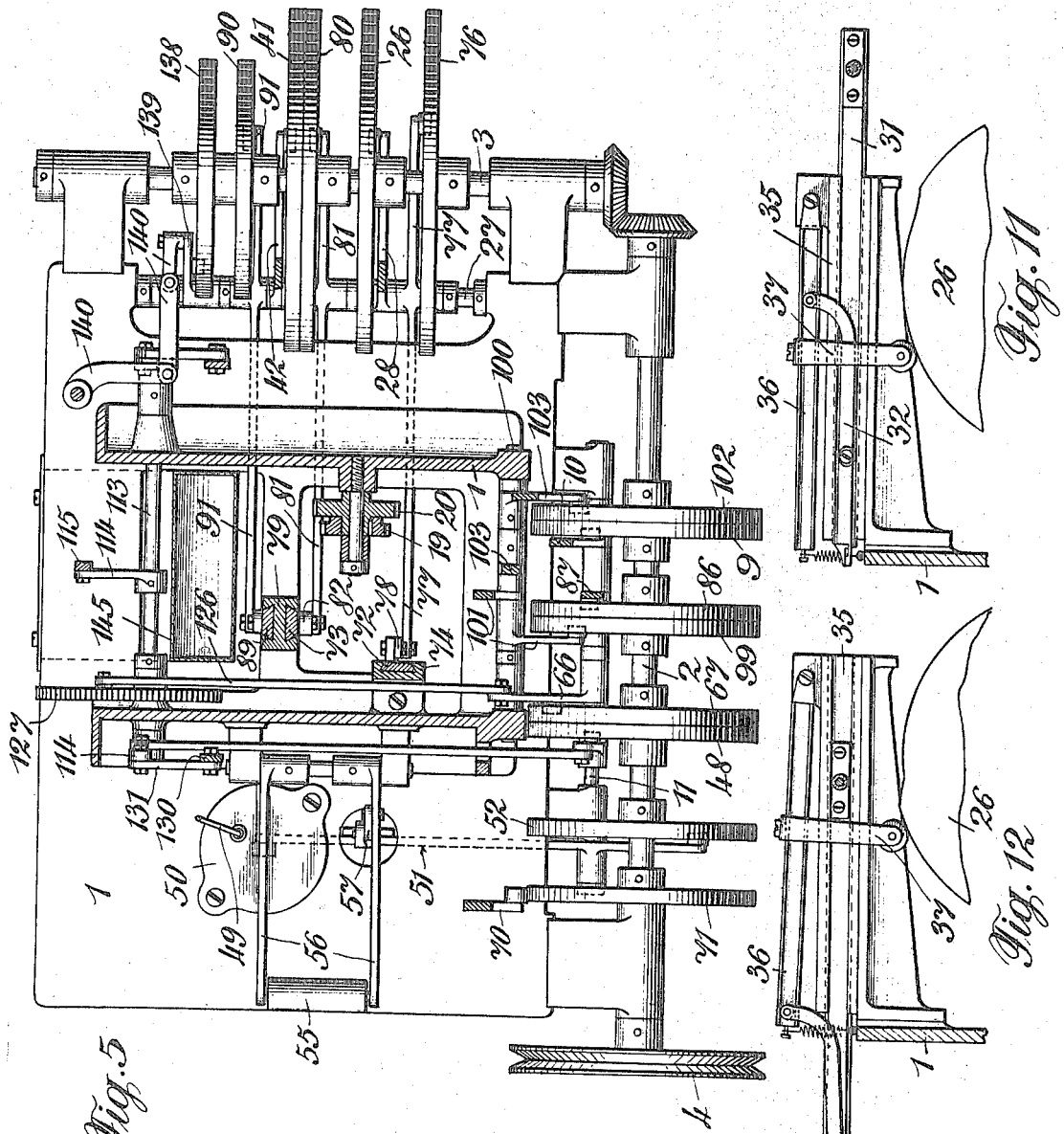

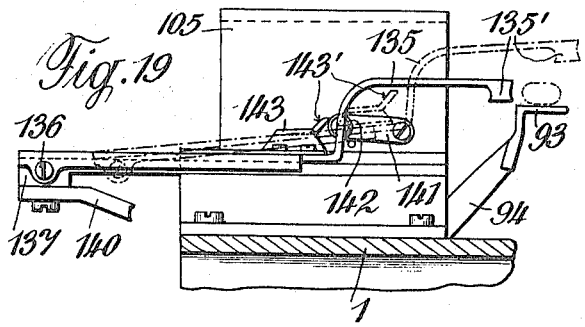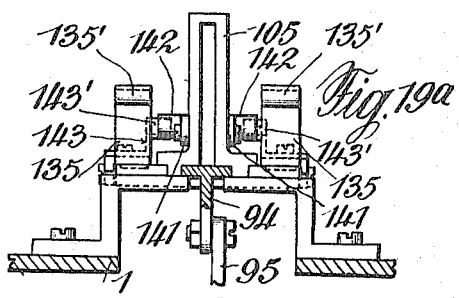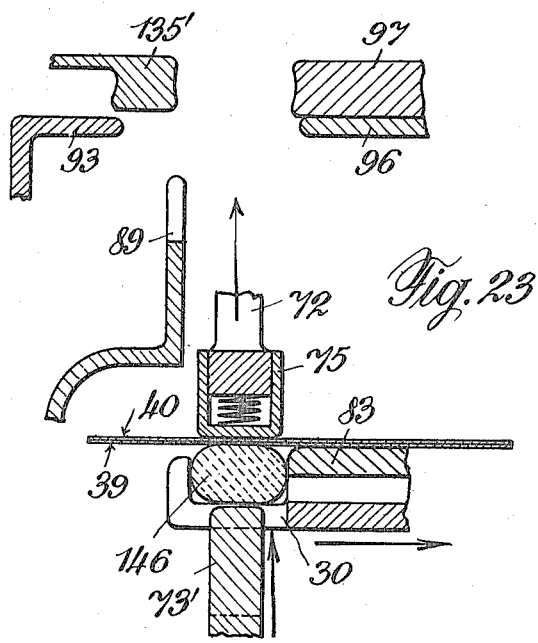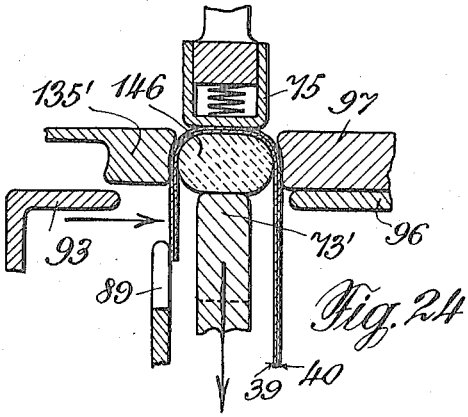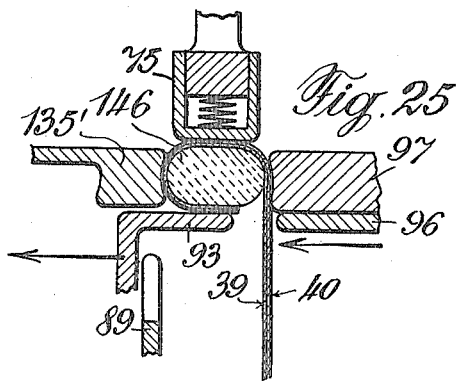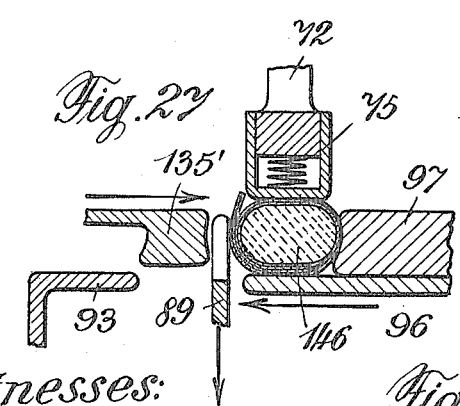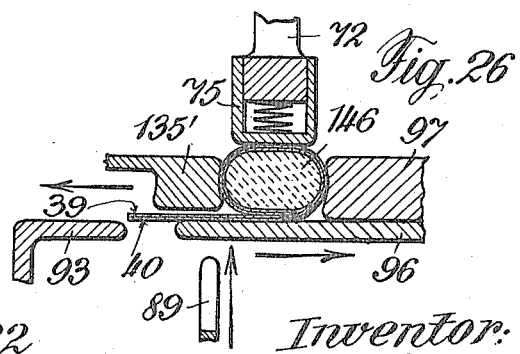

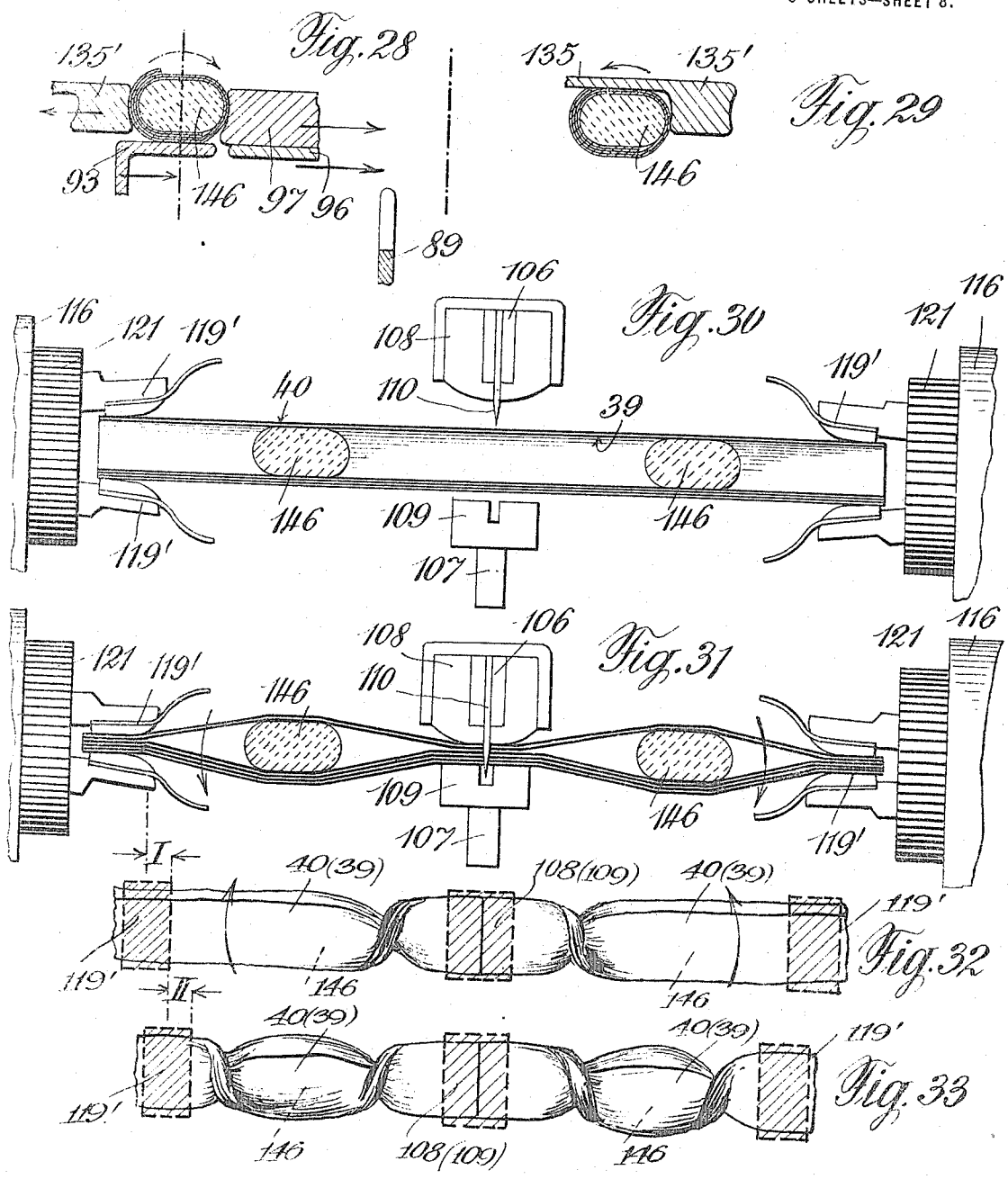

UNITED STATES PATENT OFFICE.

RICHARD ALFRED BERGER, OF LAUSANNE, SWITZERLAND, ASSIGNOR TO SAPAL SOCIÉTÉ ANONYME DES PLIEUSES AUTOMATIQUES, OF LAUSANNE, SWITZERLAND.

MACHINE FOR WRAPPING SWEETS.

1,144,022.   Specification of Letters Patent.   Patented June 22, 1915.

Application filed September 30, 1913. Serial No. 792,627.

*To all whom it may concern:*

Be it known that I, RICHARD ALFRED BERGER, a citizen of the United States of North America, residing at No. 16 Avenue de Cour, in the city of Lausanne, in Switzerland, have invented certain new and useful Improvements in Machines for Wrapping Sweets, of which the following is a specification.

This invention relates to a machine for wrapping sweets into at least one wrapper, wherein the wrapper is first folded in a tubular manner around the sweet and is then twisted together by means of a fixed central pair of tongs also by means of two outer pairs of tongs located on two opposite sides of the sweets, the said outer pair of tongs being arranged to slide and rotate relatively to the said central pair of tongs and on both sides thereof. In existing known wrapping machines of this type, only a single sweet is wrapped in each wrapping operation.

The present invention has now for its object to provide means, whereby the output of such wrapping machines is increased.

According to this invention two sweets are wrapped simultaneously at some distance apart in a common wrapper, and then the tube so formed is brought together with the sweets in such a manner between the rotary outer pairs of tongs and the fixed central pair of tongs that its central portion situated between the two sweets will come into the fixed middle pair of tongs and its end portions will lie in the outer rotary pairs of tongs, whereupon by the closing of the tongs the tube is severed in the middle of its length by a knife provided on the middle pair of tongs, and then by the rotation of the two outer pairs of tongs taking place in the same direction, the said tube is first twisted between the fixed pair of tongs, and the two sweets, and then twisted outside the latter, so that on the release of the wrapper by the three pairs of tongs there are obtained two sweets, each wrapped in a separate wrapper.

An embodiment of this invention is illustrated by way of example in the accompanying drawings, in which:—

Figure 1 is a plan of the improved wrapping machine. Fig. 2 is an elevation. Fig. 3 is a vertical section of the machine on the line A—B of Fig. 1. Fig. 4 is a further vertical section through the machine on the line C—D of Fig. 1. Fig. 5 is a horizontal section on the line E—F of Fig. 2. Figs. 6 to 21 illustrate various parts of the machine partly on a larger scale and Fig. 22 shows the wrapper with two sweets lying underneath the same. Figs. 23 to 33 illustrate the wrapping of two sweets in a common wrapper in various successive operations, and Fig. 34 shows a completely wrapped sweet.

In the sweet wrapping machine as shown, the sweets are wrapped in two wrappers, namely in an inner wrapper of transparent thin paper and in an outer wrapper of thicker paper, for instance paper bearing an inscription and serving as a label.

The machine comprises a conveyer for bringing together the wrappers and the sweets to be wrapped in the same, also mechanism for wrapping the wrappers around the sweets and further a mechanism for twisting together the ends of the wrappers at both sides of the wrapped sweets. These mechanisms are driven by means of two horizontal shafts 2 and 3 mounted in the machine framing and connected together with beveled gearing. The shaft 2 is provided with a driving rope pulley 4.

The various mechanisms will now be first described separately in succession and then will be described in their coöperation.

*1. The conveyer mechanism,* Figs. 1 to 6 and 8 to 14.—This mechanism comprises means for feeding the sweets and means for feeding wrappers.

For feeding the sweets there is fixed horizontally to the machine frame, a plate 5 upon which the sweets to be wrapped can be heaped. By the side of this plate there is arranged a horizontal endless chain 6 which carries at its periphery a plurality of trough-like receptacles 7 arranged transversely to the longitudinal direction of the chain (Fig. 9). These receptacles are open at the top and at both sides, and they serve to receive the sweets. In the direction of the plate 5 the receptacles 7 are enlarged to some extent, in order to facilitate the introduction of the sweets into the receptacles. The chain 6 extends along one side of the plate 5. The receptacles 7 of the upper stretch of the chain lie with their bottoms slightly below the surface of the plate 5. The chain 6 passes over two chain wheels 8 and receives from a feed mechanism, an intermittent forward motion from a cam 9 mounted on the shaft 2. This cam formed with a lateral cam groove operates a lever 10 which extends with an anti-friction roller into the groove, and which is mounted loosely, so as to rock loose on an axle 11 fixed horizontally under the shaft 2.

To the free end of the lever there is fixed a radius rod 12, and to the latter there is jointed a second radius rod 13. These two radius rods are connected respectively to feed levers 14 and 15. These feed levers are mounted so as to rock independently of each other on a fixed axle 16, and each carries a pawl 17, 18 respectively which coöperate together with a ratchet wheel 19 mounted so as to rotate loosely on the axle 16. This ratchet wheel is connected by toothed wheel gearing 20, 21 to the inner chain wheel 8. The cam groove of the cam disk 9 is so formed that during approximately one quarter of a revolution of the disk 9 in the direction of the arrow shown in Fig. 4, the ratchet wheel 19 will be moved by each of the successively acting pawls 16 and 17 forward through the distance of one tooth, and thus through the medium of the toothed wheels 20, 21, the chain 6 will be moved forward each time through an amount equal to the distance between two receptacles 7. At the end of each forward feed movement of the chain a receptacle 7 is brought on a level with an interrupted fixed trough 22. During the other three quarters of the revolution of the disk 9, the feed mechanism remains inoperative and the chain 6 also comes to rest.

The trough 22 is horizontally arranged in the machine and has the same direction relatively to the trough-shaped receptacle 7 of the chain 6. At the inner end of the plate 5 there is fixed a horizontal guide 23 having the same direction as the trough 22 and in which there is guided a bar 25 provided with two movable pushing tongues 24 located one behind the other. This bar receives a to-and-fro motion from the shaft 3 by means of a cam disk 26 having a side cam groove and also of a bell crank lever 28, which is operated by the same and is mounted so as to rock loosely on a fixed axle 27. One arm of this bell crank lever is connected by a radius rod 29 to the bar 25 and its other arm extends with an anti-friction roller into the groove in the disk 26 (Fig. 2).

During the inward movement of the bar 25, the two tongues 24, Fig. 10 push successively two sweets from the receptacles 7 (as they reach one after the other the level of the trough 22) of the chain 6, into the trough 22 and upon the forked ends of two slides 30 hereinafter described. During the outward movement of the bar 25 the tongues 24 move back through the equivalent receptacle 7 of the stationary chain.

For the purpose of feeding the two wrappers, there are provided two reciprocating pairs of conveyer tongs 31, 32 and 33, 34 (Figs. 11 to 14), the parts 31, 33 of which are guided in a fixed horizontal guide 35 (Fig. 12ª) and the movable parts 32 and 34 of which are guided in rocking guides 36. These guides 36 which are adapted to be moved up and down for opening and closing the tongs (Figs. 11 and 12) are provided with an arm 37 which bears with an anti-friction roller against the periphery of the cam disk 26 mounted on the shaft 3. This cam disk is formed with cam tappets (Fig. 11). The pair of tongs 31, 32 serving to feed the inner wrappers 39 that have been cut from a strip, receive their motion through the aforesaid parts 28, 29 from the cam disk 26 by reason of the fact that the pin which connects the radius rod 29 to the bar 25, also engages the part 31 of the pair of tongs 31, 32 (Fig. 1).

The pair of tongs 33, 34 serving to feed the outer wrappers 40 consisting of cut sheets, receives its motion independently of the other pair of tongs, from a side groove cam disk 41 mounted on the shaft 3, likewise through the medium of a bell crank lever 42 guided by the cam 41 and a radius rod 43 which engages the part 34 of the tongs (Fig. 1).

For the wrappers 40 there is provided a magazine 44 in which the wrappers lie piled upon one another. At the side of this magazine opposite the feeding tongs, there is provided a movable suction plate 45, at a level with the bottom of the magazine (Figs. 1 and 13, 14). To this suction plate there is connected a suction pipe. This suction plate 45 is operated by means of a two-armed lever 47 mounted so as to rock on a pivot 46. One arm of this lever is pressed by a spring against the periphery of a cam disk 48 mounted on the shaft 2 and its other arm engages the suction plate and causes it to rock to and fro at intervals. The suction plate 45 is connected through the aforesaid suction pipe 49, with an air pump 50 mounted in the framing 1.

The pump piston is operated by means of a bell crank lever 51 mounted so as to rock loose on the axle 11. This bell crank lever receives its motion from a side groove cam disk 52, mounted on the shaft 2. In this groove there engages the anti-friction roller of an arm of the bell crank lever (Fig. 5). By the well known action of the suction plate each time, the lowest wrapper 40 is sucked at its forward end, and this end is then moved down to such an extent as to allow it to be gripped by the tongs 33, 34.

As aforesaid the wrappers 39 are cut from a strip of paper drawn from a reel 53 which is mounted loose in fixed arms 54 of the machine framing (Fig. 2). From this reel the strip passes over a guide pulley 55 carried by levers 56 which serve to pull the strip off the reel. For this purpose these levers receive an up and down rocking motion from the cam disk 52, the lever 56 being connected by means of a rod 57 to the bell crank lever 51. The paper strip passes from the pulley 55 through a guide 58 situated under the magazine (Figs. 13 and 14), whence it reaches a pair of shears situated in front of the suction plate 45. These shears serve for cutting the wrappers 39 from the paper strip. The two blades 59, 60 of these shears are pivoted at 61 and are operated by means of connecting rods 62, 63 connected to an arm 64 which is pivoted on a fixed axle on the machine framing 1. The arm 64 is connected by means of a connecting rod 65 to one arm of a bell crank lever 66 which is pivoted loose on the axle 11 and which extends by means of an anti-friction roller on its other arm, into a side cam groove of a cam disk 67 mounted on the shaft 2, by means of which the shears are opened and closed. Both the conveying tongs move for the purpose of pulling the wrappers 39 and 40 through the open shears (Figs. 13 and 14) and when the tongs 31, 32 have pulled off a sufficient length of strip, the shears cut one wrapper 39 off the strip. When the paper strip is drawn forward by the tongs 31, 32 through the shears, the pulley 55 is raised and for the purpose of drawing the paper strip off the reel 53, the pulley 55 is lowered again.
During the cutting of a wrapper 39 from the paper strip, the latter is held fast by a press jaw 68 which is situated above the guide 58 and adapted to press the strip against the guide. The strip is then released again for the purpose of being drawn forward by the tongs 31, 32. The press jaw 68 is carried by one arm of a bell crank lever 70 which is pivoted at 69 to the framing 1, and whose other arm bears by means of an anti-friction roller against the circumference of a cam disk 71 mounted on the shaft 2. This cam disk is provided with a tappet and serves to operate the press jaw (Figs. 1 and 6).
*2. The wrapping mechanism*, Figs. 1 to 5, 20, 21 and 23, to 28.—This mechanism comprises an upper lifting finger 72 and a lower lifting finger 73, both of which act together like tongs. The upper lifting finger is movable up and down in a vertical guide 74 (Fig. 2) and is provided at its upper horizontal bent end with a spring gripping jaw 75. It receives its up and down movement from a cam disk 76 mounted on the shaft 3, in a side groove of which disk there engages an antifriction roller located on one arm of a two-armed lever 77 mounted loose on the axle 27 (Figs. 2 and 5), the other arm of this lever being connected by a rod 78 to the lifting finger 72.

The lower lifting finger 73 is formed at its upper end with two upwardly directed extensions 73′ which serve for gripping two sweets situated in the aforesaid slides 30. This finger 73 is likewise movable up and down in a fixed vertical guide 79 and is actuated by means of a cam disk 80 mounted on the shaft 3, and having a side groove in which engages an antifriction roller on one arm of a lever 81, which is mounted loose on the axle 27. The other arm of this lever is connected by a rod 82 to the finger 73 (Figs. 4 and 5).

The two slides 30 which serve for feeding two sweets between the two lifting fingers 72, 73, are guided in two interconnected horizontal guides 83, which are in their turn movable up and down in the frame 1 (Fig. 2). These guides 83 form with the forked inner ends of the slides 30 two pairs of tongs for holding the sweets which are pushed into them by the tongues 24. For this purpose they are coupled to the guides by springs 84 (Figs. 4 and 20), which have a tendency to pull the slides into the guides, the movement of the slides being however limited by screw stops 85. The guides 83 receive their motion from a cam disk 86 mounted on the shaft 2 formed with a side groove into which there engages by means of an antifriction roller a lever 87, which is mounted loose on the axle 11 and is connected by a rod 88 to the guides 83.

When two sweets have been pushed on to the two slides 30 along the trough 22, the guides 83 are moved inward, while by the action of the spring 84 the two sweets are held between the forks of the slides and the guides 83, and are moved inward together with the slides. When the two sweets have been lifted out of the slides 30 by the lower lifting finger 73, the guides 83 are moved back with the slides 30.

The folding mechanism comprises further a vertically movable folding plate 89 (Fig. 4), which is movable up and down in the aforesaid fixed vertical guide 79 and receives its motion from a cam disk 90 mounted on the shaft 3 having a side groove into which there engages by means of an antifriction roller one arm of a two-armed lever 91 mounted on the axle 27. The other arm of this lever is connected by a rod 92 to the folding plate 89 (Figs. 4 and 5).

93 is a horizontally movable folding plate carried by a slide 94 adapted to move horizontally to-and-fro in the framing 1 of the machine, and receives its motion from the lever 10 of the hereinbefore described advancing mechanism through the medium of a rod 95, which connects the slide 94 to the lever 10 (Fig. 4).

Opposite the folding plate 93 there are located above the guides 83 two further horizontally movable folding plates 96 and 97, which are guided one above the other in a horizontal guide 98 of the framing 1 (Figs. 1, 2 and 4). The folding plate 96 receives its motion from a cam disk 99 mounted on the shaft 2 having a side groove in which there engages by means of an antifriction roller one arm of a two-armed lever 101, which is mounted so as to rock on an axle 100. The other arm of this lever engages the folding plate 96 (Fig. 4). The folding plate 97 receives its motion from a cam disk 102 mounted on the shaft 2, having a side groove in which there engages by means of an antifriction roller one arm of a two-armed lever 103 mounted to rock loose on the axle 100, the other arm of this lever being connected by a rod 104 to the folding plate 97.

The lifting fingers 72 and 73 and the folding plates 89, 93 and 96, 97 serve to fold the two wrappers 39 and 40 around two sweets in a manner hereinafter described.

*3. The mechanism for twisting together the ends of the wrappers*, Figs. 1 to 5, 7, 15 to 19 and 29 to 34.—It comprises a fixed middle pair of tongs, and two outer pairs of tongs arranged on either side thereof, capable of rotating and sliding relatively to each other.

The fixed tongs (Figs. 1, 2, 4 and 7) comprise the two tong arms 106, 107 which are pivoted in the fixed support 105, and each of which carries at its forward end a rubber holding jaw 108, 109 respectively (Figs. 4 and 7). The upper tong arm 106 carries further a cutter 110, which projects down beyond the holding jaw 108 and has a toothed cutting edge. The jaw 109 is formed with a suitable notch for the reception of the cutting edge (Fig. 7).

The two tong arms 106 and 107 engage with each other by means of teeth, for the purpose of transmitting the motion of the driven upper tong arm 106 to the lower tong arm 107. They receive their motion for opening and closing the tongs from the aforesaid cam disk 48 which is mounted on the shaft 2 and is provided with a side groove, into which there engages by means of an antifriction roller a lever 111 mounted loose on the axle 11. This lever is connected by means of a radius rod 112 to one arm of a bell-crank lever 114, which is fixed on an axle 113 and whose other arm is connected by a rod 115 to the upper tong arm 106 (Fig. 3). The cam groove in the disk 48 is so shaped that it will cause the tongs to remain open for a certain period and also to remain closed for a certain period.

The pivoted tongs (Figs. 15 to 18) are mounted in horizontal bearing sleeves 116 fixed coaxially opposite each other to the machine frame. Each pair of tongs comprises two tong arms 119 formed as two-armed levers adapted to rock in a sleeve 117 about an axle 118, which is relatively fixed to said sleeve. These arms carry rubber holding jaws 119' at their enlarged ends which project from the sleeve 117, and they are under the influence of an interposed spring 120 which has a tendency to open the tongs.

The sleeve 117 is rotatable in the bearing sleeve 116 and has teeth 121 on the periphery of its inner longitudinal portion (Figs. 15 and 16), and it has a stepped extension 117' on which there is mounted a second sleeve 122 which is rotatable in the bearing sleeve 116 and has likewise teeth 123 on its periphery. The sleeve 122 is held immovable in the axial direction on the sleeve 117 by means of a set collar 124. At its inner end the sleeve 122 is formed internally with two notches 125 (Figs. 15 and 18) into which the rear ends of the tong arms 119 are adapted to engage under the action of the spring 120 for the purpose of opening the tongs (Fig. 16). The sleeve 117 receives its rotary motion from one arm of the bell crank lever 66 (actuated from the cam disk 67) through the medium of a rod 126 which is connected to the lever 66 and which engages a toothed sector 127 mounted loose on the axle 113. This toothed sector meshes with a toothed wheel 128 that meshes in its turn with the teeth 121 on the sleeve 117. The cam groove in the disk 67 is shaped so as to cause the sleeve 117 to make a complete revolution in one direction during a quarter-turn of the shaft 2, while the said sleeve 117 is caused to make a complete revolution in the reverse direction during the next quarter turn of the shaft 2; the said sleeve remaining stationary during the remaining half turn of the shaft 2. The toothed wheel 128 of the one sleeve 117 is mounted on an axle 129, which has the same direction as the bearing sleeves 116, and which also carries the toothed wheel 128 of the sleeve 117 of the second rotary tongs, so that the latter makes simultaneously the same movement as the first described rotary tongs.

The opening and closing of the rotary tongs are effected by turning the sleeves 122 relatively to the tong arms 119. For this purpose there meshes with the teeth 123 of each sleeve 122 a toothed sector 130 which is mounted loose on the axle 129 and is connected by a rod 131 to the bell crank lever 114 fixed on the axle 113 (Fig. 3). This lever 114 is actuated, as aforesaid, from the cam disk 48 whose cam groove is so shaped that the sleeves 122 are rotated once to-and-fro at intervals during one revolution of the shaft 2, in such manner that when the sleeves 122 are rotated in one direction the tong arms 119 will be opened and remain open for a time, while when the sleeves are rotated in the reverse direction the tongs will be closed and also remain closed for a time. In the former case the tong arms 119 snap into the notches 115 in the sleeves 122 (Fig. 16) and in the latter case they are pressed out of these notches (Figs. 15 and 18).

Since the length of the wrappers is reduced by the twisting of their ends and the tongs 119 do not release the wrappers, or allow them to slip in the tong jaws, means are provided to allow the tongs to slide axially in the bearing sleeves 116. For this purpose there is provided in the part 117' of each sleeve 117 a tension spring 132 (Fig. 15) which is attached at one end to the sleeve 117 and at its other end to a pin 133 adjustably mounted in a bracket 134 fixed to the outer end of each bearing sleeve 116. By the movement of the rotary tongs toward each other the springs 132 are tensioned, and as soon as the tong arms 119 open and release the wrappers, these springs will pull back the sleeves 117 and 122 together with the tong arms. The teeth 121 and 123 on the sleeves 117 and 122 are made of such length that the shifting of the sleeves will not cause the toothed wheels 128 and toothed sectors 130 to come out of mesh with their respective sleeves.

The twisting mechanism comprises also a forked holder 135 (Figs. 1, 4, 19, 19ᵃ, 25, 26 and 29), which is furnished at its bent free ends with holding jaws 135', and is pivoted at 136 to a slide 137 that is guided horizontally in the framing 1 under the support 105 for the fixed middle pair of tongs. This slide receives to-and-fro motion from a cam disk 138 (Fig. 5) mounted on the shaft 3, and having a side groove into which there engages by means of an anti-friction roller a lever 139 mounted loose on the axle 27. This lever is connected to the slide 137 by lever mechanism 140.

The fork arms of the holder 135 are located apart at a distance equal to the distance between the two sweets in the wrapper. The holder 135 serves, with the holding jaws 135' and the folding plate 97, to bring in its outward movement the sweets (that have been wrapped in the wrappers by the wrapping mechanisms) between the rotary tongs 119, during which operation it lies on the slide 137, that is to say, in its lower position. It also serves by means of the holding jaws 135' to prevent the sweets from being twisted when the wrappers are twisted together. For this purpose the holder must be raised during its inward movement that follows on its outward movement, in order that it may be able to pass over the wrapper that is held in the tongs. It must therefore be moved down again into its lower position before the said wrapper. For this purpose there are located, on either side of the support 105, two switches 141 which are capable of rocking up and down, and each of which is provided with a laterally projecting roller 142 and bears upon a fixed stud (Fig. 19). The rollers 142 project in the path of tongues 143 which are fixed to the holder 135 and which have inclined running-up ends 143' (Figs. 4 and 19).

144 are two small leaf-springs fixed to the slide 137, which act from below upon the connection of the two arms of the holder 135 with a tendency to rotate the holder into its lower position.

In the outward movement of the holder 135 the tongues 143 strike the rollers 142 and force them upward with rotation of the switches 141, whereupon the switches and the rollers drop back into the path of the tongues 143, so that when now the holder is moved inward again, the tongues 143 will be caused, with upward rotation of the holder 135, to run on to the rollers 142 (this position is indicated in dash-and-dot lines in Fig. 19). On leaving the rollers, the tongues 143 will drop with downward rotation of the holder (shown in full lines in Fig. 19).

145 (Fig. 4) is a discharging funnel located under the fixed tongs and the rotary tongs, through which the completely wrapped sweets can fall on being released by the tongs.

The operation of the hereinbefore described wrapping machine is briefly as follows:—When the shafts 2 and 3 are rotated in the direction of the arrow shown in Fig. 4, at each revolution of these shafts, two sweets 146 will be pushed by the pusher tongues 24 off the chain 6 along the trough 22 on to the slides 30. Then the two wrappers 39 and 40 will be brought by the two feeding tongs 31, 32 and 33, 34 over the two sweets 146, so that the said wrappers will take up the position shown in Fig. 22 in relation to the sweets. When the sweets and the wrappers have been brought together, both parts are gripped by the fingers 72 and 73 (Fig. 23) and carried up between the folding plate 89 and the two folding plates 96 and 97. By this means the flaps of the wrappers projecting beyond the sweets are folded down (Figs. 4 and 24). The finger 73 now moves down again and the folding plate 93 is advanced, whereby the flaps on one side of the two wrappers situated in front of said plate are folded by the latter against the underside of the sweets (Fig. 25), whereupon the said plate 93 remains in its advanced position. The folding plate 97 is now also advanced, and in combination with the holding jaws 135' of the holder 135 (situated in its inner position) it holds fast the two sweets with their wrappers (Fig. 25), whereupon the folding plate 93 is moved back outward and the folding plate 96 is moved inward, whereby the latter folds the second flaps of the wrappers over the first flaps against the underside of the sweets (Fig. 26). Then the holder 135 is moved away from the sweets and the folding plate 89 is moved upward, whereby the latter folds the second flaps of the wrappers up and against the sides of the sweets (Fig. 27). Then the folding plate 89 is moved back down again and the holder 135 is moved again against the sweets so as to hold fast the wrappers (which are now wrapped in tubular fashion around the two sweets) again together with the folding plate 97. Now the tube together with the two sweets is carried by the holder 135 and the folding plate 97 over and past the folding plate 93 in between the open tongs 106, 107 and 119 (Fig. 30). These three tongs in closing, grip the tube in such a manner that the rotary tongs 119 first grip the tube at both ends and then the fixed pair of tongs 106, 107 grips the tube in the middle between the sweets. The tube is thus flattened and gripped by the three pairs of tongs (Fig. 31). In this movement the fixed pair of tongs cuts by means of its cutter 110, the tube along the middle of its length, so as to form two separate wrappers, each containing a sweet.

Now after the parts 135, 93, and 96, 97 have moved outwardly in opposite direction, (Fig. 28) the sleeves 117 with the two pairs of tongs 119 are rotated in the direction indicated in Fig. 31. During the complete rotation of the tongs which now takes place, the wrappers are twisted together in one direction between the sweets and the fixed pair of tongs 106, 107 and each pair of tongs 119 is drawn through a distance I toward the other pair (Fig. 32). Now the holder 135 which after its outward movement moves back over the wrappers and comes to lie in front of the latter with its jaws 135', is moved against the wrappers, whereby the jaws engage under these parts of the wrappers in which the sweets are situated (Figs. 29 and 33). During the resulting back rotation of the sleeves 117 and the tongs 119, the jaws 135' hold fast the sweets together with the inclosing parts of the wrappers so that they cannot rotate. Consequently during the second rotation of the tongs which takes place in the opposite direction to the first rotation, only those parts of the wrappers are twisted together which are situated between each sweet and the respective pair of tongs 119 as indicated in Fig. 33, in which movement, each pair of tongs is drawn through a further distance II toward the other pair. In Figs. 32 and 33, the holding jaws of the fixed and rotary pairs of tongs are indicated by hatched surfaces, for the purpose of showing the movement of the tongs 119. The tongs 106 and 107, 119, are now again opened and the tongs 119 are drawn back again by the springs 132. Consequently the two sweets which are now completely wrapped are released, each sweet having been wrapped in a separate wrapper, the ends (viewed from one side) being twisted in the same direction (Fig. 34). The tongs 119 now remain in their open position and the holder 135 is moved outward, whereby its jaws 135' push off the wrappers which may be adhering to the holding jaws of the tongs 106, 107, 119, and at the same time in combination with the folding plate 97 brings two fresh sweets (that have been wrapped in their wrappers in the meantime) into the open tongs, whereupon the hereinbefore described twisting of the ends of the wrappers takes place anew.

Since in the hereinbefore described machine two sweets are wrapped simultaneously in two common sheet-like wrappers separately from each other, the output of the machine is increased two-fold, compared to the output of existing machines.

The axial yield of the rotary tongs 119, avoids tearing the wrapper when twisting the ends of the wrapper. Further the improved machine allows of the use of printed wrappers because in wrapping the wrapper around the sweet, the printed matter will come exactly in the middle of the sweets, since no relative shifting of the sweets and the wrapper can take place. Obviously the sweets may be wrapped in one wrapper only.

Having now described my invention what I claim as new and desire to secure by Letters Patent is:—

1. In a machine for wrapping sweets in at least one wrapper, the combination of means for bringing together two sweets situated a determined distance apart and a common wrapper for same, means for wrapping the said wrapper in a tubular manner around the two sweets, means to prevent a relative shifting of the sweets and the wrapper during this wrapping, means for gripping the tubular wrapper together with the two sweets on both ends and in the middle of the wrapper, means for cutting the wrapper between the two sweets and means for twisting the tubular wrapper outside and between the two sweets, as set forth.

2. In a machine for wrapping sweets in at least one wrapper, the combination of means for bringing together two sweets located a determined distance apart and a common wrapper for same, means for wrapping the said wrapper in a tubular manner around the two sweets, a middle fixed pair of tongs, two outer rotary pairs of tongs, a cutter on said fixed pair of tongs, and means for bringing the tubular wrapper together with the two sweets between said fixed and movable pairs of tongs, and means for actuating said tongs to hold the tubular wrapper between the sweets and to sever the same between the sweets, while the outer pairs of tongs grip the tubular wrapper outside the sweets and twist it first between the sweets and the fixed tongs and then outside the sweets, as set forth.

3. In a machine for wrapping sweets in at least one wrapper, the combination of means for bringing together two sweets located a determined distance apart and a common wrapper for same, means for wrapping said wrapper in the form of a tube around the two sweets, a middle fixed pair of tongs, two outer rotary pairs of tongs, a cutter on said fixed pair of tongs, means for bringing said tube with the two sweets between the said fixed and rotary pairs of tongs, and means for actuating said tongs, whereby the tube is held between the sweets and is cut between the sweets, and whereby the outer tongs grip the tube outside the sweets and twist it first between the sweets and the fixed pair of tongs and then outside the sweets and a movable holder for holding the wrapped sweets during the second period of the twisting of the tubular wrapper as set forth.

4. In a machine for wrapping sweets in at least one wrapper, the combination of means for bringing together two sweets located a determined distance from each other and a common wrapper for same, means for wrapping said wrapper in the form of a tube around the two sweets, a fixed middle pair of tongs, two outer rotary pairs of tongs, a cutter on said fixed pair of tongs, means for bringing the said tube with the two sweets between the said fixed and rotary pairs of tongs, and means for actuating the said tongs, whereby the tube is held fast between the sweets and is cut between the sweets, and whereby the outer tongs serve to grip the tube outside the sweets, and to twist it first between the sweets and the fixed pair of tongs, and then to twist it outside the sweets, a movable holder for holding the wrapped sweets during the second period of twisting of the tube and means for effecting an axial mutual approach of the rotary tongs during the twisting of the tube without letting go of the tube, as set forth.

5. In a machine for wrapping sweets in at least one wrapper, the combination of means for bringing together two sweets located a determined distance apart and a common wrapper for same, means for wrapping said wrapper in the form of a tube around the two sweets, a middle fixed pair of tongs, two outer intermittently rotatable and axially movable pair of tongs, a cutter on said fixed pair of tongs, a reciprocating holder with two holding jaws, a slide coöperating with said holding jaws, to bring said tube with the two sweets between the said fixed and rotatable pairs of tongs, whereby the tube is held and cut between the sweets by the fixed tongs, and whereby the outer pairs of tongs serve to grip the tube outside the sweets and to twist it first between the sweets and the fixed pair of tongs, and then to twist it outside the sweets, and means for moving the said holder into a position in which its holding jaws prevent the sweets from rotating during the second period of twisting of the tube as set forth.

6. In a machine for wrapping sweets in at least one wrapper, the combination of means for bringing together two sweets located a determined distance apart and a common wrapper for same, means for wrapping said wrapper so as to form a tube, around the two sweets, a middle fixed pair of tongs, two outer rotary pairs of tongs, two holding jaws on said fixed pair of tongs, of which one jaw comprises a toothed cutter, and the other jaw has a notch to receive said cutter when the tongs are closed, means for bringing the said tube with the two sweets between said fixed and rotary tongs, means for actuating the three pairs of tongs, whereby the fixed pair of tongs serves to hold the tube between sweets and to cut it between the sweets, while the outer tongs grip the tube outside the sweets and twist it first between the sweets and the fixed pair of tongs and then outside the sweets, as set forth.

7. In a machine for wrapping sweets in at least one wrapper, the combination of means for bringing together two sweets located a determined distance apart and a common wrapper for same, means for wrapping said wrapper so as to form a tube around the two sweets, a fixed middle pair of tongs provided with gripping jaws and a cutter, two outer tongs mounted so as to rotate and slide axially in fixed bearing sleeves, a reciprocating holder and a slide for bringing the said tube with the two sweets between the three pairs of tongs, means for rotating the two outer tongs intermittently, means for opening and closing all three pairs of tongs simultaneously, whereby the fixed pair of tongs serves to grip the tube between the sweets and to cut it between the sweets, while the outer pairs of tongs serve to grip the tube outside the sweets and to twist it first between the sweets and the fixed pairs of tongs and then to twist it outside the sweets, as set forth.

8. In a machine for wrapping sweets in at least one wrapper, the combination of means for bringing together two sweets and a common wrapper for same, means for wrapping said wrapper in the form of a tube around the two sweets, a fixed middle pair of tongs provided with gripping jaws and a cutter, two outer pairs of tongs rotatable and axially slidable in fixed bearing sleeves, a reciprocating holder and a slide for bringing the said tube with the two sweets between the three pairs of tongs, teeth on said outer pairs of tongs, toothed wheels adapted to engage with said teeth for rotating the outer pairs of tongs intermittently in one or the other direction the said fixed pair of tongs serving to hold the tube between the sweets and to cut it between the sweets, while the outer pairs of tongs serve to grip the tube outside the sweets and to twist it first between the sweets and the fixed pair of tongs and then to twist it outside the sweets, and means for moving the said holder with the holding jaws during the second period of the twisting of the tube against those parts of the tube in which the sweets are situated and thereby prevent these parts of the tube from rotating, as set forth.

9. In a machine for wrapping sweets in at least one wrapper, the combination of means for bringing together two sweets located at a determined distance apart and a common wrapper for same, means for wrapping the wrapper in the form of a tube around the two sweets, a fixed middle pair of tongs comprising gripping jaws and a cutter, two outer pairs of tongs, sleeves containing said outer pairs of tongs axially slidable and rotatable in fixed bearing sleeves in opposition to spring action, provided with teeth, a reciprocating holder and a slide for bringing said tube with the two sweets between the three pairs of tongs, toothed wheels on a common shaft gearing with said teeth, whereby the two outer pairs of tongs are rotated alternately in one or the other direction, means for opening and closing the three pairs of tongs, whereby the fixed pair of tongs serves to hold the tube between the sweets and to cut the tube between the sweets, and whereby the outer pairs of tongs serve to grip the tube outside the sweets and to twist the said tube first between the sweets and the fixed pair of tongs, and then outside the sweets, as set forth.

10. In a machine for wrapping sweets in at least one wrapper, the combination of means for bringing together two sweets located at a determined distance apart and a common wrapper for same, means for wrapping said wrapper in the form of a tube around the two sweets, a fixed middle pair of tongs provided with gripping jaws and a cutter, two outer pairs of tongs, sleeves containing said two outer pairs of tongs, axially slidable and rotatable in fixed bearing sleeves in opposition to spring action, a reciprocating holder and a slide for bringing the tube with the two sweets between the three pairs of tongs, means for opening and closing the three pairs of tongs, means for rotating the rotatable pairs of tongs, alternately in one or the other direction, whereby the tube gripped at its ends by the middle pair of tongs is first twisted between the fixed pair of tongs and the two sweets and then while the sweets are held fast, the said tube is twisted outside the two sweets, a rotary sleeve in each bearing sleeve, axially slidable in opposition to spring action with the sleeves that carry the rotary tongs for opening and closing the latter, and means for rotating the rotary sleeve intermittently to and fro, as set forth.

11. In a machine for wrapping sweets in at least one wrapper, the combination of means bringing together two sweets located a determined distance apart and a common wrapper for same, means for wrapping said wrapper in the form of a tube around the two sweets, a fixed middle pair of tongs with gripping jaws and a cutter, two outer pairs of tongs, sleeves containing said outer pairs of tongs, axially slidable and rotatable in fixed bearing sleeves in opposition to spring action, a reciprocating holder and a slide for bringing said tube and the two sweets between the three pairs of tongs, means for opening and closing the three pairs of tongs, means for rotating the rotary tongs alternately in one or the other direction, whereby the said tube gripped in the middle by the middle pair of tongs and gripped at its ends by the rotary tongs, is first twisted between the fixed pair of tongs and the two sweets, and then while the two sweets are held fast, the said tube is twisted outside the two sweets, a rotary sleeve in each bearing sleeve axially slidable in opposition to spring action with the sleeves carrying the rotary tongs formed with a notch in which during the rotation of the sleeves in one direction, the tong arms of the rotary tongs can snap under spring action for the purpose of opening the rotary tongs and from which said notch the tong arms are adapted to be displaced during the rotation of the sleeves in the other direction, for the purpose of closing the rotary tongs.

12. In a machine for wrapping sweets in at least one wrapper, the combination of means for bringing together two sweets located a determined distance apart and a common wrapper, means for wrapping said wrapper in the form of a tube around the two sweets, a middle fixed pair of tongs provided with gripping jaws and a cutter, two outer pairs of tongs, arranged in sleeves which are axially slidable and rotatable in fixed bearing sleeves in opposition to spring action, a reciprocating holder and a slide for bringing the said tube between the three pairs of tongs, means for opening and closing the three pairs of tongs, means for rotating the rotary tongs, alternately in one or the other direction, whereby the tube gripped in the middle by the middle tongs and gripped at its ends by the rotary tongs is first twisted between the fixed tongs and the two sweets and then while the sweets are held fast the tube is twisted outside the two sweets, in each bearing sleeve a rotary sleeve axially slidable in opposition to spring action with the sleeves that carry the rotary tongs, said rotary sleeves serving to open and close the rotary tongs, teeth on the periphery of said sleeves, toothed sectors engaging said teeth, means for rotating said sectors together intermittently in one or the other direction relatively to the sleeves carrying the rotary tongs, whereby the rotary tongs are opened and closed alternately, and means for opening and closing simultaneously the fixed middle tongs, as set forth.

In testimony whereof I have signed my name to this specification in the presence of two subscribing witnesses.

RICHARD ALFRED BERGER.

Witnesses:
LUFTUS FAVIC,
HENRI PASCHE.